(12) United States Patent
Inoue et al.

(10) Patent No.: US 6,362,589 B1
(45) Date of Patent: Mar. 26, 2002

(54) ROBOT APPARATUS

(75) Inventors: Makoto Inoue; Taku Yokoyama, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/487,159

(22) Filed: Jan. 19, 2000

Related U.S. Application Data

(63) Continuation-in-part of application No. 09/457,318, filed on Dec. 18, 1999.

(30) Foreign Application Priority Data

Jan. 20, 1919 (JP) .............................. 11-012292

(51) Int. Cl.⁷ ...................... G05B 15/02; G05B 19/04; G05D 1/02; G06F 17/00; A63H 13/00
(52) U.S. Cl. ................. 318/568.2; 318/568.1; 318/568.11; 318/568.12; 395/339; 395/200.67
(58) Field of Search .................. 318/560–696; 348/121; 40/414; 395/93, 94, 83, 84, 220.67, 339; 901/1, 15, 46, 47; 345/473, 474; 704/209, 207, 270; 701/1

(56) References Cited

U.S. PATENT DOCUMENTS

| | | | |
|---|---|---|---|
| 5,289,273 A | * | 2/1994 | Lang |
| 5,732,232 A | * | 3/1998 | Brush, II et al. |
| 5,790,033 A | * | 8/1998 | Yamamoto |
| 5,832,189 A | * | 11/1998 | Tow |
| 5,870,527 A | | 2/1999 | Fujikawa et al. |
| 5,929,585 A | * | 7/1999 | Fujita |
| 6,038,493 A | * | 3/2000 | Tow |
| 6,048,209 A | * | 4/2000 | Bailey |
| 6,141,019 A | * | 10/2000 | Roseborough et al. |
| 6,151,571 A | * | 11/2000 | Pertrushin |
| 6,175,772 B1 | * | 1/2001 | Kamiya et al. |

FOREIGN PATENT DOCUMENTS

| | | | |
|---|---|---|---|
| JP | 10-289006 | * | 10/1998 |
| JP | 10-328422 | | 12/1998 |
| JP | 11-18 | * | 7/1999 |
| JP | 11-188678 | * | 7/1999 |
| WO | WO-0066239 | * | 9/2000 |
| WO | WO-00-66 | * | 11/2000 |

OTHER PUBLICATIONS

Amazon.com: buying info: Tekno the Robotic Puppy. No date.*
Amazon.com: buying info: Silver with Green Trim Poo–Chi Interactive Puppy. No Date.*
Amazon.com: buying info: Rocket the Wonder Dog: Gray. No date.*
Amazon.com: buying info: 102 Dalmatians: Domino. No date.*
Amazon.com: buying info: Kitty the Robotic Kitten. No date.*
Amazon.com: buying info: Big Scratch & Lil Scratch. No date.*

* cited by examiner

*Primary Examiner*—Paul Ip
(74) *Attorney, Agent, or Firm*—Frommer Lawrence & Haug LLP; William S. Frommer; Gordon Kessler

(57) ABSTRACT

A robot apparatus generating behavior or performing actions. The robot apparatus comprises a parameter generator for generating one or more parameters of an emotion model defining a predetermined emotion and one or more parameters of an instinct model defining a predetermined instinct. An input signal representative of an external stimulus and an input signal representative of an internal stimulus are provided to the robot apparatus. One or more semantic contents are determined in accordance with the detected input signals, and at least one of the emotion model parameters and the instinct model parameters are changed based upon the semantic content. A behavior model is then generated to generate behavior or actions in accordance with the emotion parameters of the emotion model and the instinct parameters of the instinct model.

64 Claims, 11 Drawing Sheets

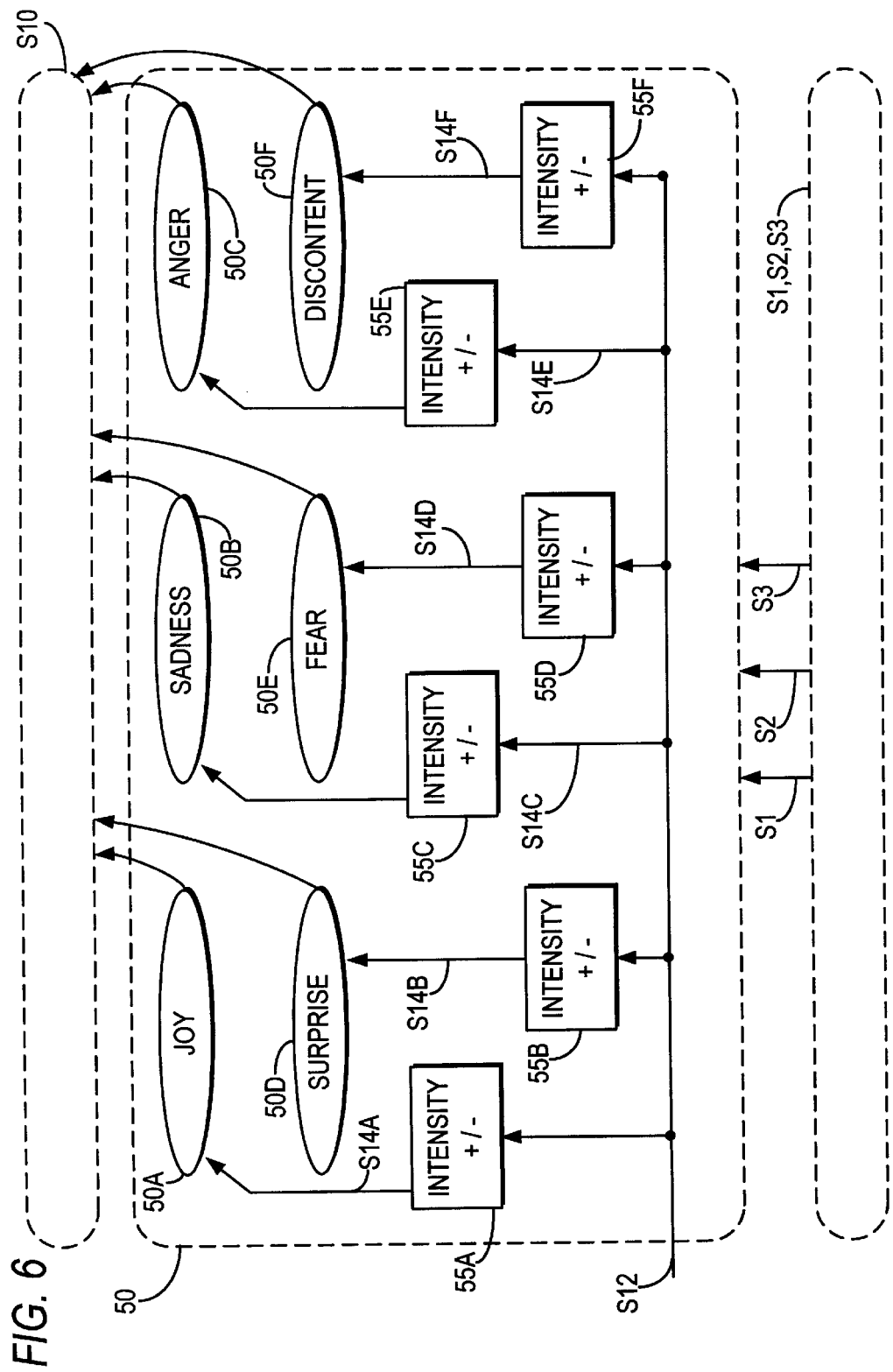

ROBOT APPARATUS

CROSS REFERENCE TO RELATED APPLICATIONS

This application is a Continuation-In-Part of application Ser. No. 09/457,318 filed Dec. 8, 1999.

BACKGROUND OF THE INVENTION

1. Field of the Invention

The present invention relates to a robot apparatus, and more particularly it is suitably applied to a pet robot constructed as, for example, a four-footed animal performing autonomous, life-like actions.

2. Description of the Related Art

Heretofore, a four-footed walking pet robot has been proposed and developed which performs actions in predetermined ways in response to commands from a user or depending upon local environmental conditions. Such a pet robot resembles a four-footed animal often kept in the house, such as a dog or cat. A dog-like pet robot, for example, is designed to always lie down upon receiving a command "lie down" from the user, or to always give a "hand" (front paw) when the user stretches his or her hand to just under the robot's nose.

However, such a conventional pet robot performs actions only in predetermined ways in accordance with commands from the user or local environmental conditions. Thus, the conventional pet robot does not act as an autonomous robot capable of determining, and acting upon an action by itself. In other words, the conventional pet robot does not behave as a genuine pet, and therefore has a difficulty in fully satisfying a user's demand of obtaining a pet robot that functions as closely as possible to a genuine pet.

OBJECTS OF THE INVENTION

Accordingly, it is an object of the invention to provide a robot apparatus capable of autonomously behaving in natural ways.

It is another object of the invention to provide a robot apparatus capable of learning various behaviors in response to both external and internal environmental conditions.

It is a further object of the invention to provide a robot apparatus in which the behavior of the robot apparatus is determined in accordance with an emotion model and an instinct model.

An additional object of the invention is to provide a pet robot apparatus that behaves in a manner most similar to the behavior of an actual pet.

Still other objects and advantages of the invention will in part be obvious and will in part be apparent from the specification and drawings.

SUMMARY OF THE INVENTION

To achieve the above objects of the invention, a robot apparatus is provided. The robot apparatus behaves in accordance with input information supplied to the robot apparatus. The robot apparatus includes an emotion model and an instinct model, these models changing in accordance with various stimuli. A next action to be performed by the robot apparatus is determined by changing the emotion model and the instinct model based upon the input information, and the interpretation of this input information. Because the robot apparatus constructed in accordance with the invention includes the motion and instinct models linked to its actions, and because the robot apparatus decides the next action to be taken thereby by changing the emotion and instinct models based upon the input information, the robot apparatus can autonomously behave in accordance with the present emotional and instinctive states created thereby in accordance with the historical actions thereof.

Also in accordance with the invention, a robot apparatus behaving in accordance with input information supplied to the robot apparatus is provided. The robot apparatus includes an operating state deciding unit for deciding a next operating state to be changed to from a current operating state based upon the current operating state, a history of various input information having been previously supplied in succession to the robot apparatus immediately prior to the current input information, and the current input information. Therefore, the robot apparatus in accordance with the invention can autonomously behave in accordance with the emotional and instinctive states it created in accordance with the historical actions thereof.

Further, in accordance with the invention, a robot apparatus is provided that determines a next posture to be taken based upon the current physical configuration, possible future configurations, and the input information. The robot apparatus includes a posture transition unit for transitioning the current posture of the robot apparatus to a next posture in accordance with the input information via a predetermined route of steps of the mechanisms of the robot apparatus. Because the current posture of the robot apparatus is transitioned to the next posture in accordance with the input information via a predetermined route, the robot apparatus can avoid being forced to take an impossible or otherwise undesirable posture, or from falling down during the transition.

The invention accordingly comprises the several steps and the relation of one or more of such steps with respect to each of the others, and the apparatus embodying features of construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 6 is a diagram showing data processing executed by the emotion model unit of FIG. 5 in accordance with an alternative embodiment of the invention;

DETAILED DESCRIPTION OF THE PREFERRED EMBODIMENTS

Figure 1:
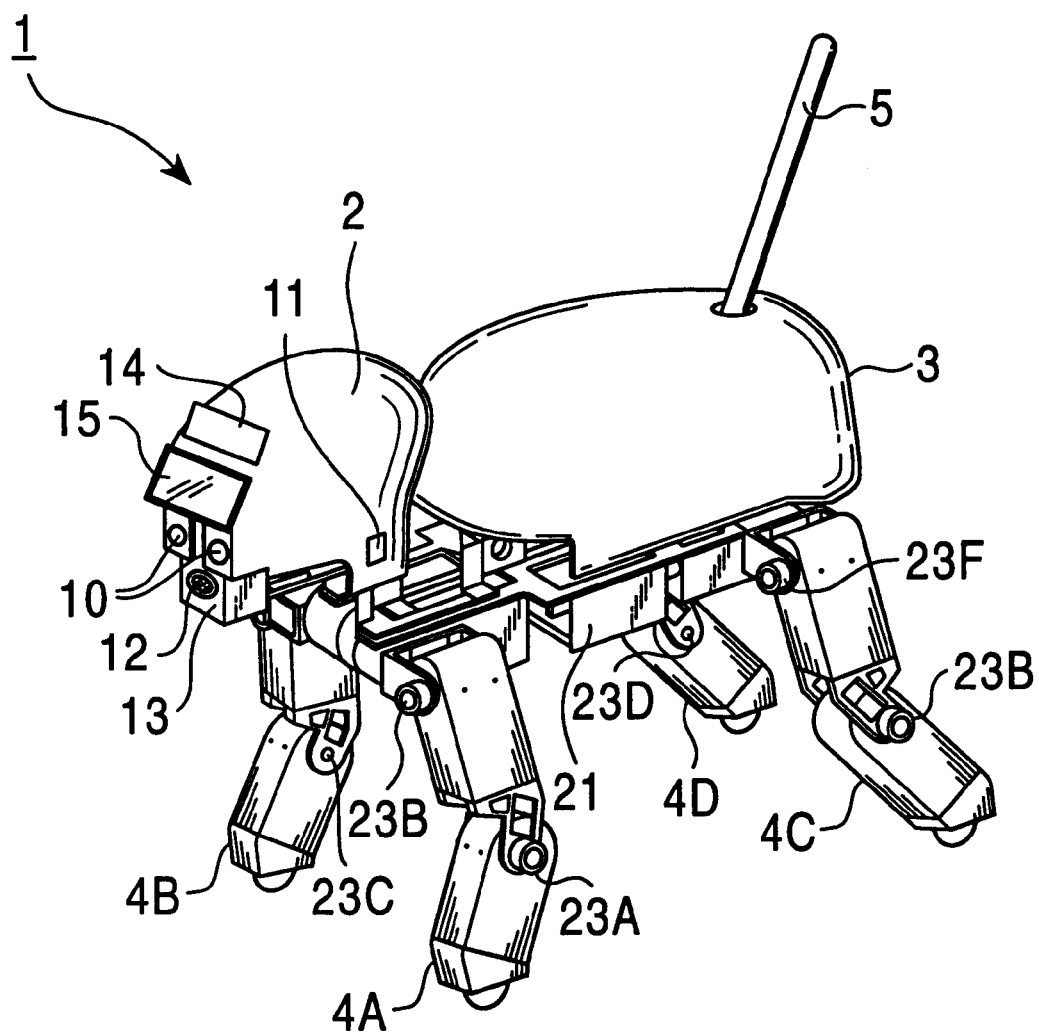
FIG. 1 is a schematic view depicting a first embodiment of a pet robot constructed in accordance with the invention.

Referring first to FIG. 1, a first, preferred embodiment of the invention will be described.

Construction of a Pet Robot

In FIG. 1, a pet robot 1 comprises a head portion 2, a body portion 3, leg portions 4A–4D, and a tail portion 5. These components are appropriately coupled into the form of a pet as desired. Head portion 2, leg portions 4A–4D and tail portion 5 are moved relative to body portion 3 so that the pet robot behaves like a genuine four-footed animal. While FIG. 1 depicts a particular structure of a pet robot, other configurations, including both minor and major modifications, may be employed.

Head portion 2 includes an image detecting unit 10, corresponding to eyes of a live pet, and comprising, e.g., a CCD (Charge Coupled Device) camera for detecting an image. A microphone 11, corresponding to an ear of a live pet, receives and hears various sounds, such as a voice. A speaker 12, corresponding to a mouth of a live pet, generates a voice. Each of these components is attached to head portion 2 at respective predetermined positions. Head portion 2 further includes a remote controller command receiver 13 for receiving commands transmitted from a user via a remote controller (not shown). A touch sensor 14 is also provided for detecting the contact of, for example, a user's hand upon head portion 2.

In a preferred embodiment, pet robot 1 is provided with an image display unit 15 including both red and green LEDs, indicative of anger and pleasure, respectively. Body portion 3 includes a battery 21 attached to a position corresponding to the belly of a live pet. An electronic circuit (not shown) is installed within body portion 3 for controlling the operation of pet robot 1.

Actuators 23A–23N are provided respectively at the articulation joints of legs 4A–4D, at joints between legs 4A–4D and body portion 3, at a joint between body portion 3 and head portion 2, at a joint between body portion 3 and tail portion 5, etc. Actuators 23A–23N are driven under the control of the electronic circuit installed within body portion 3. Pet robot 1 is able to move as a genuine four-footed animal by driving actuators 23A–23N in such a manner that head portion 2 swings vertically or horizontally, tail portion 5 wags, and legs 4A–D move to make the pet robot walk or run, as desired.

Figure 2:
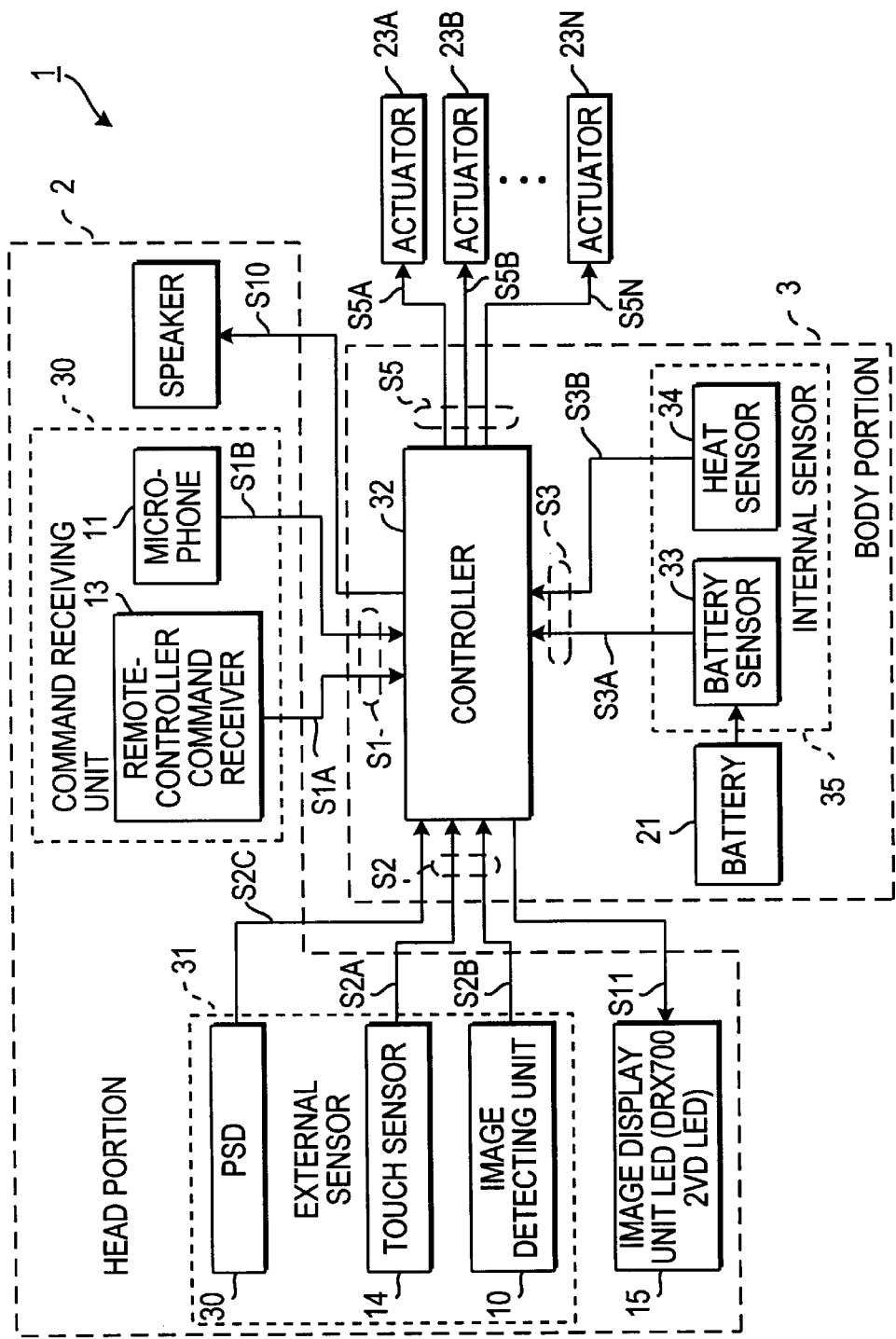
FIG. 2 is a block diagram depicting a circuit configuration of the pet robot of FIG. 1.

The circuit configuration depicting the electrical structure and make-up of pet robot 1 will now be described, making reference to FIG. 2. Head portion 2 includes a command receiving unit 30, which is made up of microphone 11 and remote-controller command receiver 13; an external sensor 31, which is made up of image detecting unit 10, touch sensor 14 and a position sensing device 310; speaker 12; and image display unit 15 including the LEDs as noted above. Body portion 3 includes battery 21 attached to its lower surface, and also includes therein a controller 32 for controlling the operation of the pet robot 1. An internal sensor 35 is also provided in body portion 3. Internal sensor 35 is made up of a battery sensor 33 for detecting the remaining charge of battery 21 and a heat sensor 34 for detecting the head generated inside pet robot 1. Further, the actuators 23A–23N are provided in the noted predetermined positions of pet robot 1, and are controlled by controller 32 as necessary.

During use, command receiving unit 30 receives commands, such as "walk", "lie down", etc., given from the user to pet robot 1. Command receiving unit 30 is made up of remote-controller command receiver 13 and microphone 11, and therefore can receive a command from a user via remote control, or via sound or voice. When a desired command is input to the remote controller (not shown) by manipulation of the user, the remote controller transmits an infrared ray in accordance with the input command to remote-controller command receiver 13. Upon receiving the infrared ray, remote-controller command receiver 13 produces a reception signal S1A and forwards this signal to controller 32. When the user utters a desired vocal command, microphone 11 receives the uttered vocal command from the user, produces a voice signal S1B, and then forwards this signal to controller 32. Thus, command receiving unit 30 produces command signals S1 (reception signal S1A and voice signal S1B) in accordance with commands given to pet robot 1 from the user. The command signals S1 are then forwarded to controller 32.

Touch sensor 14 of external sensor 31 detects actions applied to pet robot 1 from the user such as "stroking" and "striking". When the user performs a desired action by touching touch sensor 14, touch sensor 14 produces a contact detection signal S2A depending on the applied action, and forwards this signal to the controller 32.

Image detecting unit 10 of external sensor 31 queries the external environment of pet robot 1 and detects information indicative thereof, such as "dark" and "there is a favorite toy", or motions of other pet robots such as "another pet robot is running". To this end, image detecting unit 10 detects images in the surroundings of pet robot 1 and transmits a resulting image signal S2B to controller 32.

Position sensing device similarly detects the current position of the pet robot, and generates sensing signal S2C, depending on the position. Thus, external sensor 31 produces external information signals S2 (contact detection signal S2A, the image signal S2B and position sensing signal S2C) in accordance with external information collected from the exterior of pet robot 1. External information signals S2 are then forwarded to the controller 32.

Internal sensor 35 detects the inner status of pet robot 1 itself, such as "hungry" meaning that the battery charge is low, and "hot" meaning that it is too hot inside the robot. Internal sensor 35 is therefore made up of battery sensor 33 and heat sensor 34. Battery sensor 33 detects the remaining charge of battery 21, used for supplying power to various circuits in the pet robot 1, and transmits a resulting battery-charge detection signal S3A to controller 32. Heat sensor 34 detects the head generated inside pet robot 1, and transmits a resulting heat detection signal S3B to controller 32. Internal sensor 35 therefore produces internal information signals S3 (battery-charge detection signal S3A and heat detection signal S3B) in accordance with detected information describing internal conditions of pet robot 1. These internal information signals S3 are then supplied to controller 32.

Controller 32 produces control signals S5A–S5N for driving actuators 23A–23N based upon command signals S1 supplied from command receiving unit 30, external information signals S2 supplied from external sensor 31, and internal information signals S3 supplied from internal sensor 35. Control signals S5A–S5N are transmitted respectively to actuators 23A–23N for driving them, whereupon the pet robot 1 operates in an autonomous manner.

Controller 32 also produces, as required, a voice signal S10 and an image signal S11 which are output to the exterior of pet robot 1. The voice signal S10 is output to the exterior via speaker 12, and the image signal S11 is transmitted to LED unit 15 to display necessary information to the user.

Data Processing in Controller

Data processing in controller 32 will now be described. Controller 32 executes software data processing of the command signals S1 supplied from command receiving unit 30, the external information signals S2 supplied from external sensor 31, and the internal information signals S3 supplied from internal sensor 35 in accordance with a program previously stored in a predetermined memory area. Resulting control signals S5 are supplied to actuators 23A–23N.

Figure 3:
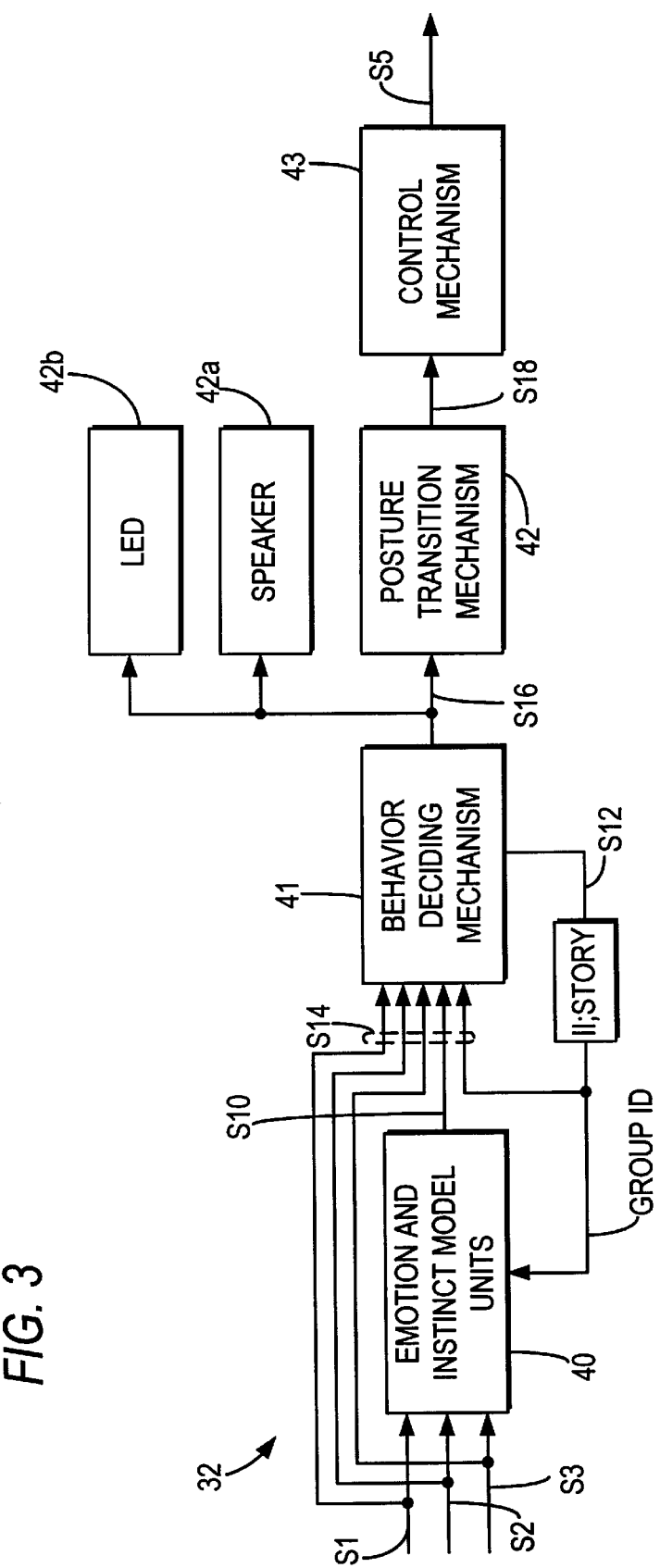
FIG. 3 is a block diagram depicting the flow of data processing in a controller of FIG. 2.

As shown in FIG. 3, details of data processing in controller 32 are functionally divided into a model unit 40 that includes processing based upon an instinct model and an emotion model and means for changing each of these emotion or instinct models; a behavior deciding mechanism 41 as a means for determining a next operating state; a posture transition mechanism 42 as a posture transition means and including a speaker 42a and an LED unit 42b; and a control mechanism 43 for controlling the movement and action of pet robot 1. The command signals S1 supplied from exterior sensors, such as remote control command receiver 13 and microphone 11, the external information signals S2 supplied from external sensors, such as touch sensor 14, position sensing device 310 and image recognizing unit 10 of the external sensor, and the internal information signals S3 supplied from battery sensor 33 and heat sensor 34 are applied to both emotion and instinct model units 40, and behavior deciding mechanism 41.

Figure 4:
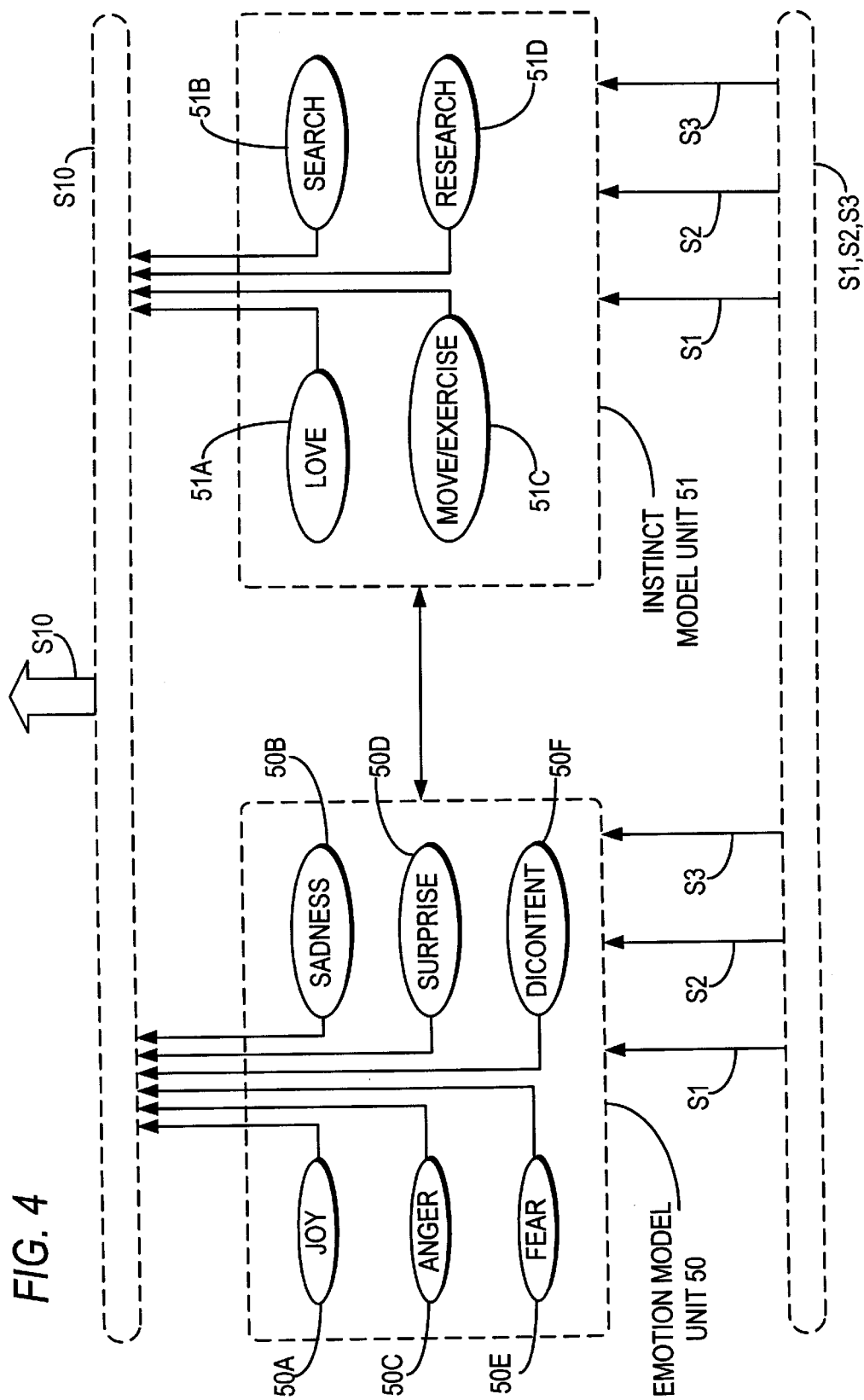
FIG. 4 is a diagram depicting the flow of data processing executed by an emotion model unit and an instinct model unit, and the flow of information therebetween.

As shown in FIG. 4, the emotion and instinct model units 40 include emotion model 50 and an instinct model 51. Emotion model 50 has a group of basic emotions comprising emotion units 50A–50F that act as a plurality of mutually interdependent emotion models. Instinct model 51 has a group of basic desires comprising desire units 51A–51D that act as a plurality of mutually interdependent instinct models. Of the group of basic emotions, emotion unit 50A represents "joy", emotion unit 50B represents "sadness", emotion unit 50C represents "anger", emotion unit 50D represents "surprise", emotion unit 50E represents "fear", and emotion unit 50F represents "discontent". Each of the emotion units 50A–50F indicates a degree of the particular emotion with intensity varying on a scale from 0 to 100 levels in a preferred embodiment.

As is shown in FIG. 4, information signals S1, S2 and S3 are forwarded to emotion model unit 50, and more specifically to each emotion unit 50A–50F (arrows to each individual emotion unit not being shown for clarity). Based upon these input values, a relative level of each emotion is determined. In addition to taking into account the input signals, each emotion unit also considers the levels of other emotion units. For example, some of the emotions have a positive correlation with other of the emotions, while some of the emotions have a negative condition with other of the emotions. Thus, for example, if discontent level 50F is determined to be high, anger level 50C will also be high, while joy level 50A will be low.

Furthermore, each input signal S1, S2, S3 is considered differently by each emotion unit. Thus, the internal sensor values S3 might be considered more importantly by discontent unit 50F than surprise unit 50D. Thus, each emotion unit considers the supplied input signals, the levels of the other emotion units, its prior output level value, as well as the levels of the various instinct units (as will be explained below) to determine a current value, and each of these values are combined and output to form a signal S10. The values and intensities of these emotions change from moment to moment in accordance with command signals S1, external information signals S2, and internal information signals S3 supplied to them, and other noted values. Thus, emotion model unit 50 represents time-dependent changes of the emotions in a modeling manner; namely, it expresses an emotional state of the pet robot 1 by combining the momentarily varying intensities of outputs from the emotion units 50A–50F with each other to form part of signal S10.

Instinct model 51 has a group of basic instincts comprising instinct units 51A–51D which act as a plurality of mutually interdependent instinct models of the group of basic instincts. Instinct unit 51A represents "love", instinct unit 51B represents "search", instinct unit 51C represents a "desire for movement or exercise" and instinct unit 51D represents appetite, or a desire for "recharge". As with emotion units 50A–50F, each of the instinct units 51A–51D indicates a degree of the desire with intensity varying from 0 to 100 levels in a preferred embodiment.

As is further shown in FIG. 4, information signals S1, S2 and S3 are forwarded to instinct model unit 51, and more specifically to each instinct unit 51A–51D (arrows to each individual instinct unit not being shown for clarity). Based upon these input values, a relative level for each instinct is determined. In addition to taking into account the input signals, the instinct units also consider the levels of the other instincts. For example, some of the instinct have a positive correlation with other of the instincts, while some of the instincts have a negative correlation with other o the instincts. Thus, for example, if recharge level 51D is high, search level 51B may also be high, while love level 51A may be low, and move/exercise level 51C might also be low.

Furthermore, each input signal S1, S2, S3 is considered differently by each instinct unit. Thus, the internal sensor values S3 might be considered more importantly by recharge instinct unit 51D than love instinct unit 51A. Each instinct unit therefore considers input signals, the levels of the other instinct units, its prior level, as well as the levels of the various emotion levels to determine a current value.

Thus, as is further shown at FIG. 4, each of the instinct units considers the level of the emotion units, and vice versa. For example, a high recharge level 51D will also likely result in high anger level 50C and discontent level 50F, and a low joy level 50A. More than one emotion or instinct may therefore be present, but in different levels. Furthermore, by each instinct or emotion unit considering its prior level, erratic behavior can be avoided.

Therefore, changes in the intensity of instinct take place from moment to moment in accordance with command signals S1, external information signals S2 and internal information signals S3 supplied to them. Instinct model unit 51 represents time-dependent changes of the instinct desires in a modeling manner; namely, it expresses an instinctive state of the pet robot 1 by combining the momentarily varying intensities of outputs from instinct units 51A–51D with each other.

In general, the emotion model unit is more concerned with external stimuli, and the instinct model unit is more concerned with internal stimuli. Thus, while the emotion model will pay most attention to S1, moderate attention to S2, and less attention to S3, the instinct will pay greater attention to S3, moderate attention to S2 and less attention to S1. However, all of the inputs and other factors noted above are considered for each emotion or instinct unit.

After a consideration of all relevant factors, the emotion and instinct model units 50 and 51 change the intensities of respective outputs from the individual emotion model units 50A–50F and the individual instinct model units 51A–51D. Then, emotion and instinct model unit 40 combines the varying intensities of outputs from the emotion units 50A–50F from the instinct units 51A–51C to decide the next emotional and instinctive state of the pet robot. The decided emotional and instinctive state is transmitted as state information S10 to behavior deciding mechanism 41.

Further, in one embodiment of the invention, in addition to considering all of the inputs noted above to determine an instinct or emotion unit level value, the emotion and instinct model units 40 couple desired ones of the emotion model units 50A–50F in a mutually inhibiting or stimulating manner. Thus, when the intensity of output from one of the coupled emotion units is changed, the intensity of output from the other emotion unit is also changed correspondingly. This contributes to realizing the pet robot 1 expressing natural emotions. This procedure may also be followed concerning the instinct model units.

Figure 5:
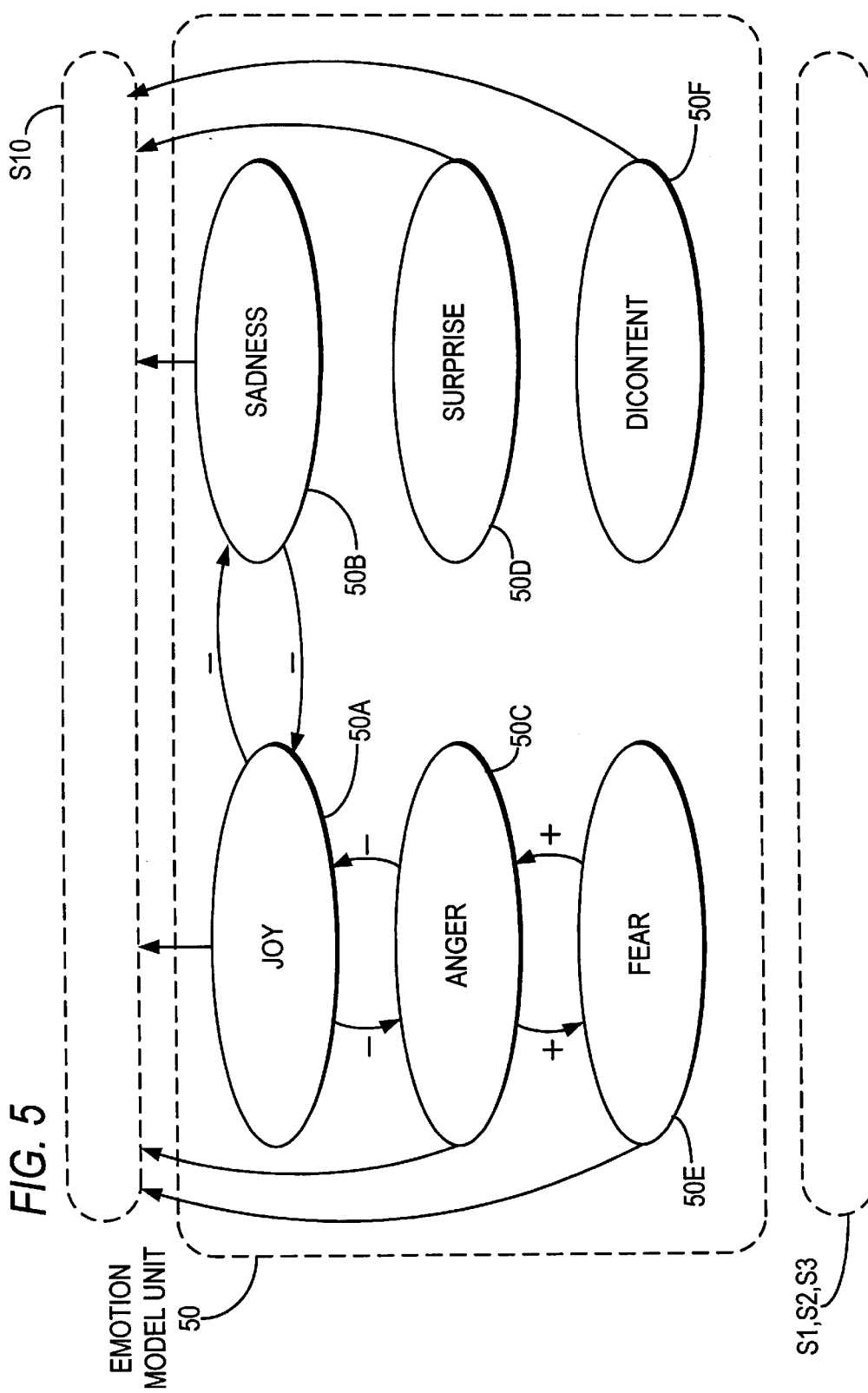
FIG. 5 is a diagram showing data processing executed by the emotion model unit of FIG. 4.

More specifically, as shown in FIG. 5, the emotion model unit 50 couples the "joy" emotion unit 50A and the "sadness" emotion unit 50B in a mutually inhibiting manner such that when the pet robot is praised by the user, the intensity of output from the "joy" emotion unit 50A is increased and the intensity of output from the "sadness" emotion unit 50B is reduced correspondingly which cause the intensity level output from the "joy" emotion unit 50A to increase and the intensity level output from the "sadness" emotion unit 50B to be changed to reduce at the same time. Also, with the emotion model unit 50 coupling both emotion model units 50A and 50B, when the intensity level output from the "sadness" emotion unit 50B is increased, the intensity level output from the "joy" emotion unit 50A is reduced correspondingly with an increase in the intensity level output from the "sadness" emotion unit 50B.

While only a small number of correlations are shown in FIG. 5, indeed each emotion (or instinct) unit can include one or more of such correlations. The use of such correlations, in addition to the considerations noted above for determining unit output levels, can further insure natural actions by the pet robot.

Returning to FIG. 3, the emotion and instinct model units 40 are supplied with historical behavior information S 12 indicating the nature of current or past action of pet robot 1 itself, such as "it has been walking for a long time", from behavior deciding mechanism 41. Thus, in addition to considering the past intensities of the emotion or instinct model units, the current behavior of the pet robot is considered when deciding the next behavior to be invoked. Depending on e action of pet robot 1 indicated by this historical behavior information S12, therefore, the emotion and instinct model unit 40 may produce different state information S10 even if input information S1–S3 does not change, and also aids in guarding against erratic or unexpected behavior.

As is shown in FIG. 6, in an alternative embodiment, rather than having each emotion or instinct unit perform multiple calculations, emotion model unit 50 includes intensity increasing/reducing (+/–) units 55A–55F which are disposed upstream of emotion model units 50A–50F, respectively. (Instinct model unit 51 would include similar structure, but is not shown). These intensity (+/–) units perform the function of increasing and reducing the intensities of the output values from emotion model units 50A–50F based on the historical behavior information S12 indicating the current and past action of pet robot 1, and input information signals S1–S3 provided to each intensity (+/–) unit. The intensities of the output values from emotion units 50A–50F are increased or reduced in accordance with intensity information S14A–S14F output from intensity increasing/reducing units 55A–55F, respectively.

For example, when the pet robot 1 greets the user and the user strokes the head of the pet robot 1, i.e., when the historical behavior information S12 indicates "pet robot 1 greets the user" and the input information S1–S3 indicates "user strokes the head of pet robot 1", this information is applied to the intensity increasing/reducing unit 55A and the emotion model unit 50 increases the intensity of the value output from the "joy" emotion model unit 50A. However, for example, when the user strokes the head of pet robot 1 while pet robot 1 is doing some work or task, i.e., when the historical behavior information S12 indicates "pet robot 1 is doing some work" and the input information S1–S3 indicates "user strokes the head of pet robot 1", this information is applied to the intensity (+/–) function 55A, the emotion model unit 50 may not change the intensity of output from the "delight" emotion unit 50A.

Thus, the emotion model unit 50 decides the intensities of respective outputs from emotion model units 50A–50F while referring to not only the input information S1–S3 but also the historical behavior information S12 indicating the current or past action of pet robot 1. Accordingly, for example, when the user strokes the head of the pet robot 1 while pet robot 1 is doing some task, it is possible to prevent an increase in the intensity of the output value from the "joy" emotion unit 50A and to avoid pet robot 1 from expressing an unnatural emotion of delight. Similarly, for the instinct units 51A–51D, instinct model unit 51 also increases and reduces the intensities of respective outputs from the instinct units 51A–S1D in accordance not only with input information S1–S3, but also historical behavior information S12 supplied thereto.

As described above, upon receiving input information S1–S3 and historical behavior information S12, intensity increasing/reducing functions 55A–55F produce an output value intensity information S14A–S14F depending on a plurality of preset parameters that may be learned with use, or may have a preset value. By presetting the parameters to different values from one pet robot to another, or by allowing the pet robot to "learn", i.e. allowing the parameters to be modified based upon human responses to various actions taken by the pet robot, each pet robot can be given individual characteristics, e.g., one pet robot being irritable and another pet robot being cheerful. This learning feature is also applicable to the prior embodiment in which the emotion and instinct model units change without additional modification units.

Returning once again to FIG. 3, behavior deciding mechanism 41 decides a next action to be taken by the pet robot based on input information S14, including command signals S1, external information signals S2, internal information signals S3, emotion and instinct state information S10, and historical behavior information S12. Once the next action to be performed has been decided, behavior deciding mechanism 41 transmits the contents of the decided action, as action command information S16, to posture transition mechanism 42, speaker 42a and LED 42b.

Figure 7A:
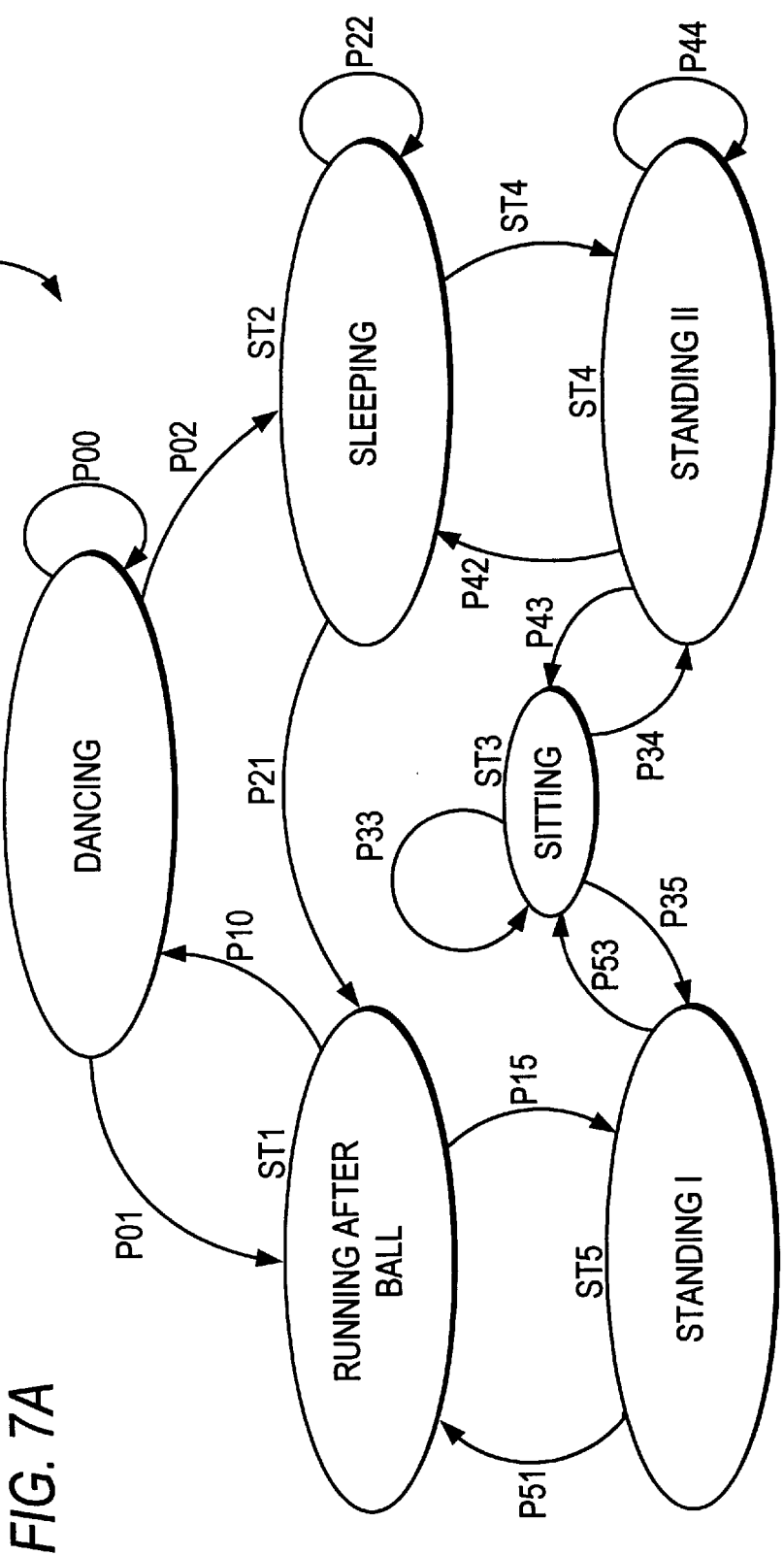
FIG. 7A is a state transition diagram depicting the transition of the robot apparatus from state to state in a behavior deciding mechanism.

More specifically, as shown in FIG. 7A, behavior deciding mechanism 41 employs an algorithm called a finite automation 57 having a finite number of states. Each of these states represents a possible behavior by the pet robot. While a number of states are shown in FIG. 7A, these are only by way of example. Any desired number of states could exist in such a finite automation in the pet robot. The pet robot moves from the current state to the next state based on both the currently supplied input information S14 and the current state, thereby deciding the next action. Thus, behavior deciding mechanism 41 transitions from one state to either the same, or another state each time input information S14 is supplied. The next action of the pet robot is thus determined depending on the transitioned to behavior state. The next action of the pet robot is determined by referring to not only the current input information S14 and the past input information S12, but also utilizing a state transition table such as the (simplified) table of FIG. 7A.

As is shown in FIG. 7A, a plurality of possible states are shown. These include state ST0, where the pet robot is dancing. State ST1, where the pet robot is running after a ball, state ST2, where the robot is sleeping, state ST3, where the pet robot is sitting, state ST4, where the pet robot is standing, and state ST5, where the pet robot is also standing, but in a manner different from that of step ST4. As is further shown in FIG. 7A, each possible state includes a number of arcs leading to and from that state. For example, ST0 includes a first arc P00, from and to ST0 (forming a loop), a second arc P01 from ST0 to ST1, a third arc P10 from St1 to ST0, and a fourth arc P02 from ST0 to ST2. The number of arcs shown is for example only. Any number of arcs may be present to or from any particular state. Each state includes similar arcs, as shown. No state comprises a dead-end, each having at least one arc from it to another state.

Each arc represents a possible state transition for the pet robot. Thus, a dancing pet robot has three possible transitions (in the example of FIG. 7A). A first transition along arc P00 is to continue dancing. A second possible transition along arc P01 is to begin running after a ball. A third possible transition along arc P02 is for the pet robot to begin sleeping. Each of the states also includes similar possible transition arcs, none of the arcs forming a dead end. The pet robot is able to transition from state to state along any of the indicated arcs. However, while the pet robot may transition along any of the indicated arcs, the likelihood, or probability of the pet transitioning to one arc, as opposed to a different arc may not be the same. Thus, in FIG. 7A, when dancing, the pet robot might be most likely to continue dancing (arc P00), moderately likely to transition to running after the ball (arc P01), and is least likely to go to sleep (arc P02).

Figure 7B:
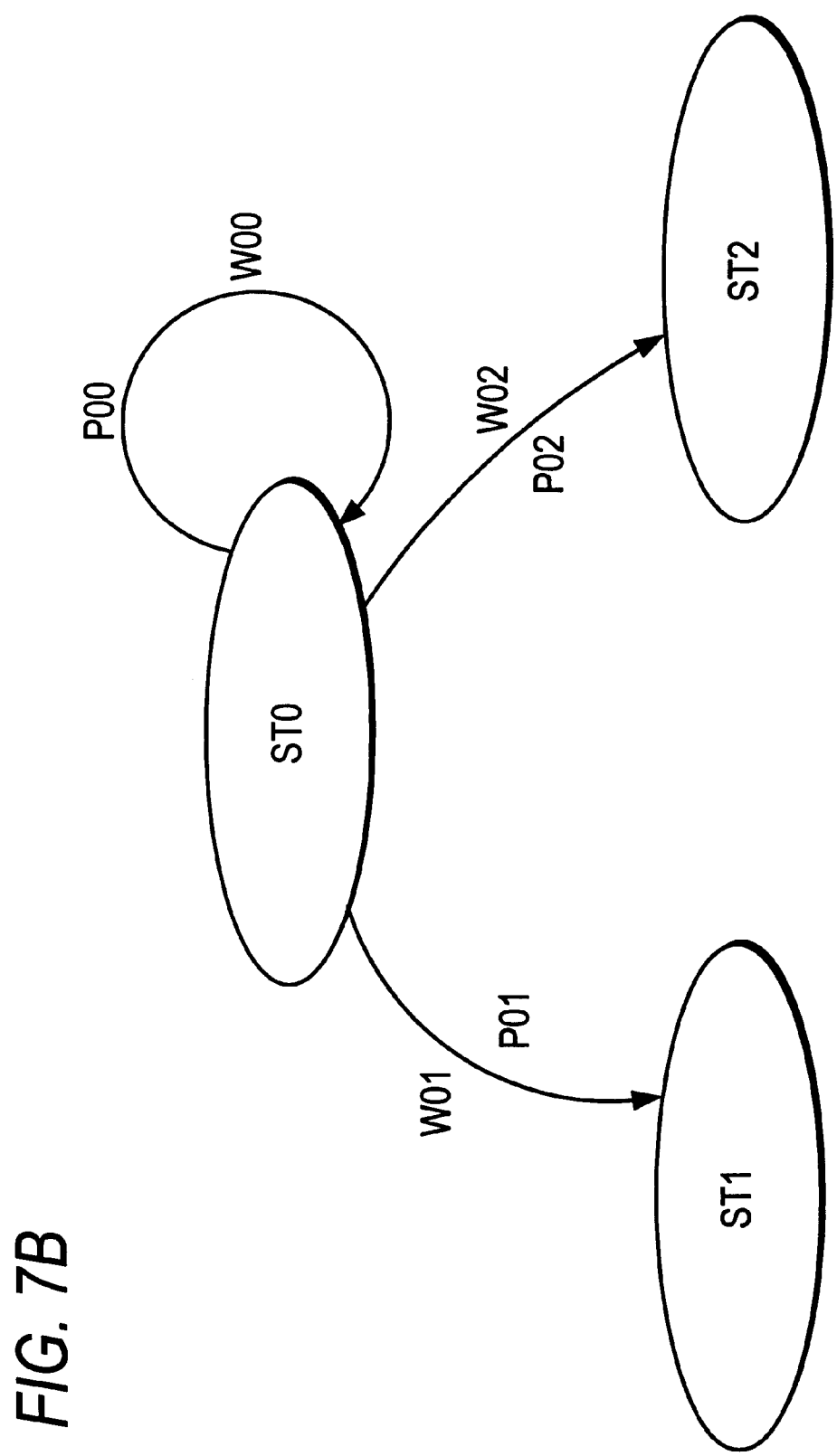
FIG. 7B is a portion of the state transition diagram of FIG. 7A depicting the weighting of transition arcs.

Referring to FIG. 7B, a probability weighting transition diagram for transitioning from state ST0 is shown. In FIG. 7B, each possible transition arc P00, P01, P02 includes a respective probability weighting value W00, W01, W02. It is these weighting values that indicate the likelihood of a particular transition will be made along a particular arc. As noted above, if arc P00 is to be most likely, arc P01 is to be moderately likely and arc P02 is to be least likely, a possible weighting scheme might include W00=0.70; W01=0.25; W02=0.05. Because the pet robot must make some transition, the weighting values leaving any node must sum to 1. Because the possible transitions are determined based upon probabilities, a more realistic acting pet robot can be provided where the sequence of states or actions is not always the same.

In addition to providing weighted probabilities of transition, in accordance with the invention, it is possible to change the weighting factors based upon any desired factors. For example, if the previously noted weighting factors are used, and the pet robot is dancing for a long time, the weighting factor for transitioning to sleeping (arc P02, W02) may be raised to indicate that the pet robot is tired, and the weightings for W00 and W01 could be reduced. It is therefore possible to alter the likelihood of possible future actions. It is this weighting system that allows for the pet robot to learn. For example, if upon retrieving a ball the robot receives praise from a user, the pet robot will increase the weighting value of any arc leading to the "running after ball" state. Thus, when the pet robot receives an input signal that a ball is present, the pet robot will be more likely to chase the ball to receive the expected praise. This process can be performed for any action, and can also be performed with scolding to reduce the likelihood of a particular action.

In accordance with the invention, it is the output value of the emotion and instinct model units that dictate the weighting values for each of the arcs. Therefore, if the joy output value is increased, all arcs leading to the dancing state of the pet robot might have their weightings increased, therefore increasing the chances that the pet robot will next dance. In accordance with the current determined emotional and instinctual state, the weighting probabilities for moving among the available states can be set. The pet robot will therefore act more naturally, and in accordance with both internal and external stimuli.

Upon detecting a predetermined trigger, behavior deciding mechanism 41 effects transition from a current state to a next state. Concretely, a trigger is provided by, for example, the fact that a period of time during which the action in the current state continues has reached a certain value, a particular input information S14 is applied, or the intensity of an output value from one or more of emotion units 50A–50F or instinct units 51A–51D has exceeded a predetermined threshold.

Based on the intensity of the output values from the emotion units 50A–50F and instinct units 51A–51C, the arc probability weightings are set. Thereafter, in accordance with this generated probability state transition model, behavior deciding mechanism 41 determines the state to be transitioned to next. In other words, even with the same command signals S1, S2, S3 applied to the pet robot, for example, behavior deciding mechanism 41 effects transition to the different states depending additionally upon the intensities of output values from emotion units 50A–50F and instinct units 51A–51D, and with some amount of pseudo-randomness for selecting the transition arc to follow after the probability weightings are adjusted.

Accordingly, for example, upon detecting that the user's hand is stretched to just under the pet robot's nose, based upon external information signals 52, and if it is determined that the intensity of the output value from "anger" emotion model unit 50C is output value of low and that the intensity of recharge instinct model unit 50D is low (the pet robot is not hungry), indicating that the battery voltage is not lower than a predetermined threshold, behavior deciding mechanism 41 adjusts the weighting of the various arcs so that the pet robot is more likely to "give the hand" in response to the user's hand being stretched to just under the pet robot's nose. While the chance of this response is increased, the pet robot might still perform a different action. Once the action has actually been selected, it is then transmitted to posture transition mechanism 42.

Also, for example, upon detecting that the user's hand is stretched to just under the pet robot's noise, based upon external information signals S2, that the intensity of the output value from "anger" emotion model unit 50C is low and that the intensity of the output value of recharge instinct model unit 50D is high (the pet robot is hungry), indicating that the battery voltage is lower than the predetermined threshold, behavior deciding mechanism 41 adjusts the weighting of the various transition arcs so that the pet robot is more likely to "lick the user's hand". Of course, as noted above, the pet robot can still follow another course of action in accordance with one of the other transition arcs. Once an action has been actually selected, it is transmitted to posture transition mechanism 42.

Moreover, in accordance with the intensity of the output values from one or more of emotion units 50A–50F or instinct units 51A–51C, behavior deciding mechanism 41 additionally determines the magnitude of one or more parameters for the action performed in the transitioned state, e.g., the speed of walking, the stroke and speed of motions of the hand and legs, and the pitch and loudness of sounds uttered. Action command information S16 is then produced depending on the determined parameters for the action, and is transmitted to posture transition mechanism 42.

Returning once again to FIG. 3, posture transition mechanism 42 produces posture transition signal S18 for indicating a desired transition from a current posture to a next posture. This posture transition information is generated based on behavior command information S16 supplied from behavior deciding mechanism 41. This posture transition information S18 is then forwarded to control mechanism 43. The next posture to be transitioned to from the current state is therefore decided. The actual movements to be made from the current state to the next state are then determined depending on physical features of pet robot 1 such as the shapes and weights of the body, hands and legs, including possible joint movements between them, and also based on the mechanism of actuators 24A–23N such as the directions and angles in and over which the joints can be bent.

Figure 8:
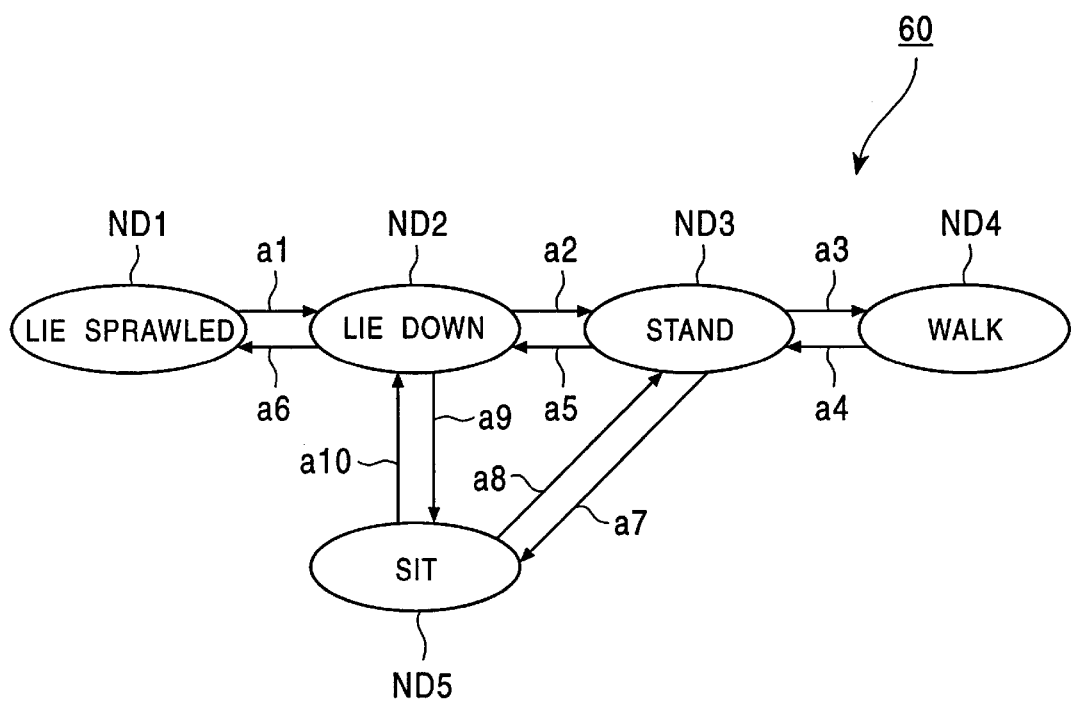
FIG. 8 is a posture transition diagram for determining a posture deciding mechanism.

The available postures are grouped into postures capable of being directly transitioned to from the current state and postures incapable of being directly transitioned to from the current state. For example, as is shown in FIG. 8, pet robot 1 can directly transition from a posture node ND1 in which the pet robot is lying sprawled out to a posture node ND2 in which the pet robot is lying down, but cannot directly transition from posture node ND1 in which the pet robot is lying sprawled to a posture node ND3 in which the pet robot is standing up. The latter transition from posture node ND1 to posture node ND3 requires a two-step motion. A first step of transitioning from node ND1 to ND2 by drawing the hands and legs near the body to take the posture at node ND2 of lying down is implemented. A second step of transitioning from node ND2 to ND3 by standing up from the lying down posture is then implemented. Because the transition between posture nodes must follow predetermined steps, the taking of postures which the pet robot cannot safely take can be avoided. For example, pet robot 1 turns over easily when attempting to raise both the hands for cheering from the stand-up posture Therefore, this posture transition would not be an available transition.

In view of the above, the postures capable of being directly transitioned to and from are registered beforehand in posture transition mechanism 42, and form a node posture state diagram such as that shown in FIG. 8 (the actual state diagram for use in pet robot 1 would be far more complicated). Each node in FIG. 8 includes adjacent states into which it can transition and from which it can transition. When behavior command information S16 supplied from behavior deciding mechanism 41 indicates that the next posture to be transitioned to is a posture capable of being directly transitioned to from the current posture, posture transition mechanism 42 transmits that action command information S16 to control mechanism 43. On the other hand, when behavior command information S16 supplied from behavior deciding mechanism 42 produces posture transition information S18 for effecting transition to the desired target posture after transition through one or more intermediate postures, there might first be a transition from the current posture to another intermediate posture capable of being directly transitioned to from the current posture, and thereafter a second transition from the intermediate posture to the final desired posture that can be transitioned to from the intermediate posture. This generated posture transition information S18 is then forwarded to control mechanism 43. By employing such two-step motions, pet robot 1 can avoid taking postures that are unsafe, and can thus avoid moving through an unsafe posture, or from turning over inadvertently because of moving through a posture transition beyond its ability.

Therefore, as shown in FIG. 8, in posture transition mechanism 42, the postures capable of being taken by pet robot 1 are registered beforehand, and the relation between every two postures capable of being transitioned from one to the other are recorded. For example, in FIG. 8 posture transition mechanism 42 employs an algorithm called a directional graph 60 in which the postures capable of being taken by pet robot 1 are represented by nodes ND1–ND5, as noted above, and every pair of postures capable of being transitioned between nodes ND1–ND5 are coupled by directional arcs a1–a10.

When behavior command information S16 is supplied from behavior deciding mechanism 41, posture transition 42 plans such a posture transition schedule that the node ND corresponding to the current posture is coupled to the node ND which is represented by behavior command information S16 and corresponds to the posture to be taken next by the pet robot. This posture transition schedule may include a route leading from the current node ND to a one or more next nodes ND following the direction indicated by each directional arc "a", in order to reach the final destination node ND. By recording the nodes ND positioned on a determined best route in order from the current node ND to the desired final node, the pet robot can follow this route quickly and easily. As a result, pet robot 1 can perform the action transition instructed by behavior deciding mechanism 41 while avoiding a dangerous state, or from turning over because of an unsafe temporary posture taken during transition from a current posture to a desired posture.

As is further shown in FIG. 8, assuming for example that the current posture corresponds to node ND 2 indicating that the pet robot is in the "lying down" posture, when behavior command information S16 indicating "sit" is supplied, posture transition mechanism 42 supplies the posture transition information S18 indicating "sit" to the control mechanism 43. This is done after a determination by posture transition mechanism 42 that pet robot 1 it is allowed to directly transition from node ND2 indicating the "lying-down" posture to node ND5 indicating the "sitting" posture. On the other hand, when behavior command information S16 indicating "walk" is supplied when the pet robot is currently in the "lying-down" posture, transition mechanism 42 plans a posture transition schedule by determining a route leading from node ND2 indicating the "lying-down" posture to node ND4 indicating the "walking" posture. This route results in a path through node ND3 indicating the "standing" posture. Posture transition mechanism 42 then produces posture transition information S18 first moving from the "lying-down" posture to the "stand-up" posture, and thereafter from the "stand-up" posture to the "walk" posture. This posture transition information is then followed by the transmission of the produced posture transition information S18 to control mechanism 43.

Figure 9:
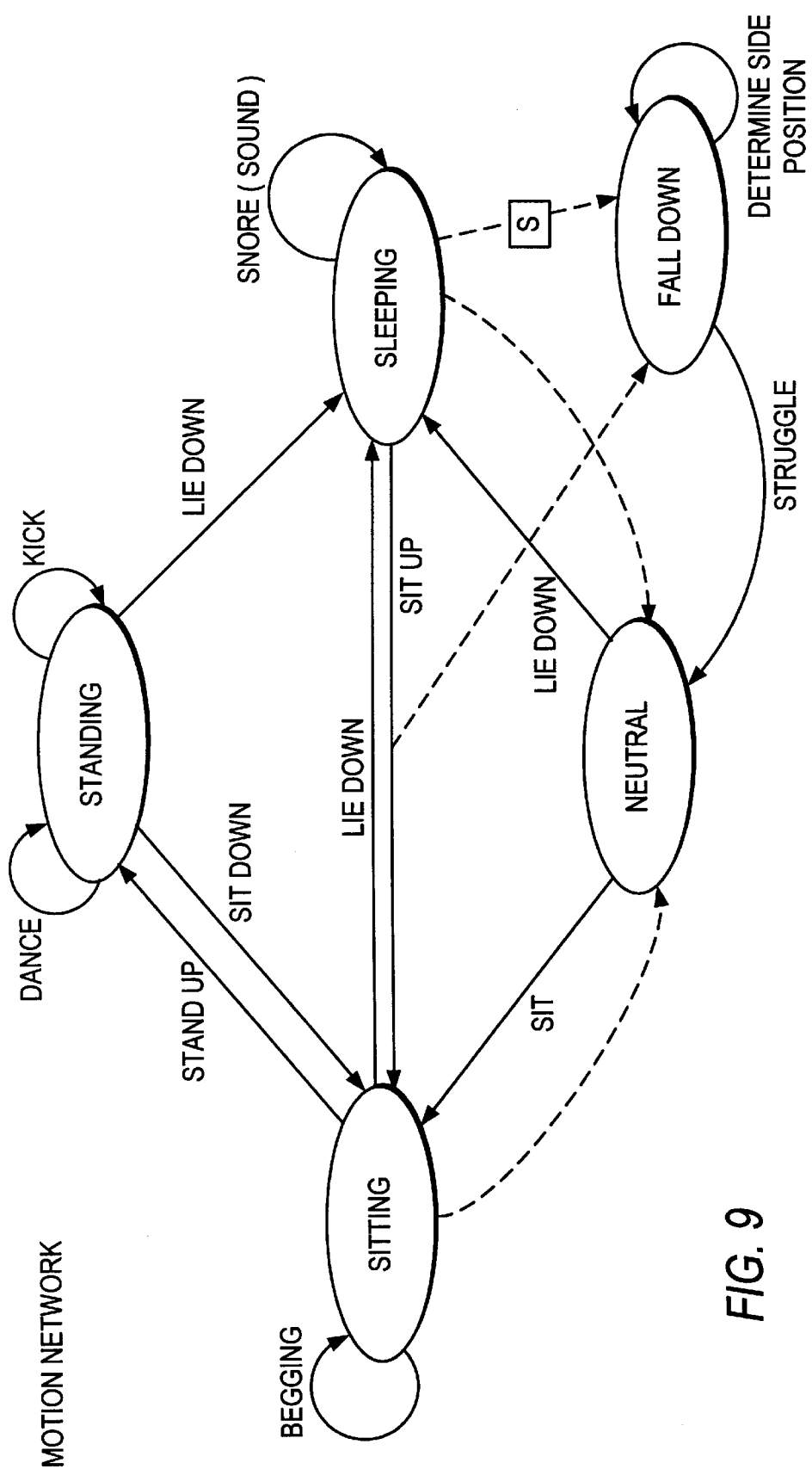
FIG. 9 is an additional posture transition diagram depicting a neutral and a fall down state.

While FIG. 8 represents a relatively simple posture transition state diagram, more complicated posture transition state diagrams may be used. A portion of such a diagram is shown in FIG. 9. This diagram includes a number of posture nodes similar to those of FIG. 8, including sitting, and standing, and also includes additional nodes for sleeping and, a neutral node that will be further described below. The first important difference is that not all of the transition paths include arcs that are two way. Thus, while a pet robot acting according to FIG. 9 can move directly from a standing posture to directly a sleeping posture, the pet robot cannot move from a sleeping posture directly to a standing posture, but rather must move through a sitting posture. This is to avoid undesirable positions during transition, as in FIG. 8, but also employs a realization that certain transitions only generate an undesirable position when moving in a particular direction in the chart.

Next, it should be noted that the posture transition arcs of FIG. 9 all refer to and thus describe an action. This action is what is necessary to move from a current posture node to a next posture node. However, while this movement is similar in that which would be required in FIG. 8, movement between two posture nodes is not the only type of possible action. Specifically, self-referential actions are possible when a beginning node and next node are the same. If a posture transition arc only defined transition between posture nodes, such a self-referential arc would act as a timing delay. However, because these arcs can define actions, the self-referential arcs of FIG. 9 define actions such as "begging" while sitting, "snoring" (from the speaker) while sleeping and "dancing" or "kicking" while standing. The availability of these self-referential actions enhance the realism of the behavior of the pet robot. Use of these self-referential arcs can be dictated by the behavior and posture determination sequences noted above.

An additional important new feature of the embodiment of the existence of a special "neutral" posture node. All of the prior discussion has assumed that the pet robot will always reside in one of a plurality of predefined states. However, it is possible that the pet robot might be moved while it is not operating, or a particular joint could move in an unexpected manner. Either of these situations might result in the pet robot not being aware of its current posture (i.e., the pet robot is not in one of the predefined states and is also not transitioning between two predefined states). In this case, it is not possible to determine any movement that should be taken to arrive at a next desired posture. Additionally, any unknown movements might result in an unsafe posture, possibly damaging the pet robot.

In order to account for this possibility, a "neutral" state is provided in accordance with the invention. This "neutral" state is entered into from any other posture, predefined or not by slowly and carefully relaxing and opening all joints of the pet robot, for example. Therefore, dotted lines in FIG. 9 indicate this transition to the neutral state. These dotted lines would emanate from any node, any point on any action or transition, or even from any posture not normally allowed by the pet robot, and therefore are not represented on the chart. Once the pet robot has reached this neutral position, it has reached a defined node on the chart of FIG. 9, and transition from this neutral node to other desired nodes in a safe manner, as described above can be performed.

Finally, an additional feature shown in the embodiment of FIG. 9 includes a "fall down" node. If knocked over, or even if proceeding along proper action and transition arcs, the pet robot falls over, it is necessary for the pet robot to determine that it has fallen, and to then get up. To determine it has fallen, a sensor "S" functions as an acceleration sensor, and registers that the pet robot has fallen over by a measured acceleration. If the appropriate sensor reading is reversed, the pet robot will assume that it is currently at the "fall down" node. While the falling transition arc is shown emanating from the sleeping node, like the neutral state transition arcs, arcs leading to the "fall down" state can come from anywhere on the diagram.

After determining it has fallen, the pet robot must then determine how to get up. Upon entering the "fall down" node, the pet robot performs a "determine side position" action depicted in FIG. 9 as a self-referential action arc. This arc employs a predetermined sequence of actions to determine the actual position and orientation of the pet robot. In the preferred embodiment of a pet robot dog, as shown in FIG. 1, the dog will either be on its right side or left side. Therefore, turning the head of the pet robot dog in both directions to determine which direction encounters an obstruction (the ground) will allow a determination of on which side the pet robot dog is lying. If another pet robot structure were used, an alternative test sequence would be employed to determine orientation and position.

After determining that it has fallen, and its orientation, the pet robot is considered existing at a particular node "fall down". From this node, a predetermined action sequence "struggle" is performed to transition the pet robot to the neutral node discussed above. Another sequence of postures could also be defined. Rather than advancing to "neutral", advancing to "lying-down", or "standing", could be possible, for example, based upon the posture of the pet robot before falling and confirmation that this movement will not damage the pet robot. In this manner, a pet robot that has fallen over can determine that it has fallen, and safely get up.

Referring once again to FIG. 3, when posture transition mechanism 42 receives behavior command information S16 from behavior deciding mechanism, the next behavior to be implemented has been determined. In addition to sending this information to the posture control mechanism, it is also forwarded to speaker 42a and LED 42b. Because upon generation of behavior command information S16 all action to be taken are determined, and posture transition only implements these determined behaviors, sound and light from the LED and speaker can also be instructed in accordance with behavior control information S16.

Each behavior dictated by behavior deciding mechanism 41 requires movement of a predetermined number of parts of the pet robot of the invention. Thus, in a preferred embodiment, if the pet robot includes a body, head, legs and a tail, while standing up from a sitting position might require all of these parts, other actions, such as sitting from a standing position, or walking might require less than all of these parts. In order to accomplish these movements most efficiently and naturally, two control modes are available to be invoked in behavior control information S16.

The first mode is an "entire" body mode. This mode is used when all parts of the body are required to follow a predetermined sequence of movements for the pet robot to transition from a current state to a next state. No substantial variation by any part of the pet robot is permitted. All parts are instructed in accordance with a single set of commands.

The second mode is a "component" mode in which individual parts of the pet robot are controlled through individual sets of commands. Therefore, if a pet robot is walking, for example, a single set of commands exists for movement of the legs. The walking posture specifies a particular sequence of movements of the legs for walking.

However, neither the head nor the tail are required for walking. Therefore, in accordance with the invention these currently unnecessary parts are controlled to move independently, in accordance with the various input data to behavior deciding mechanism. For example, if the decision is made for the pet robot to walk, the movement of the legs is determined as required for walking. However, the tail wagging and head positions can be independently determined based on the emotional or instinctual state. If the pet robot is happy, the tail can wag more, the head can be held raised up, and the pet robot will appear joyful. If sad, the movement of the tail and head can be adjusted accordingly.

Figure 10:
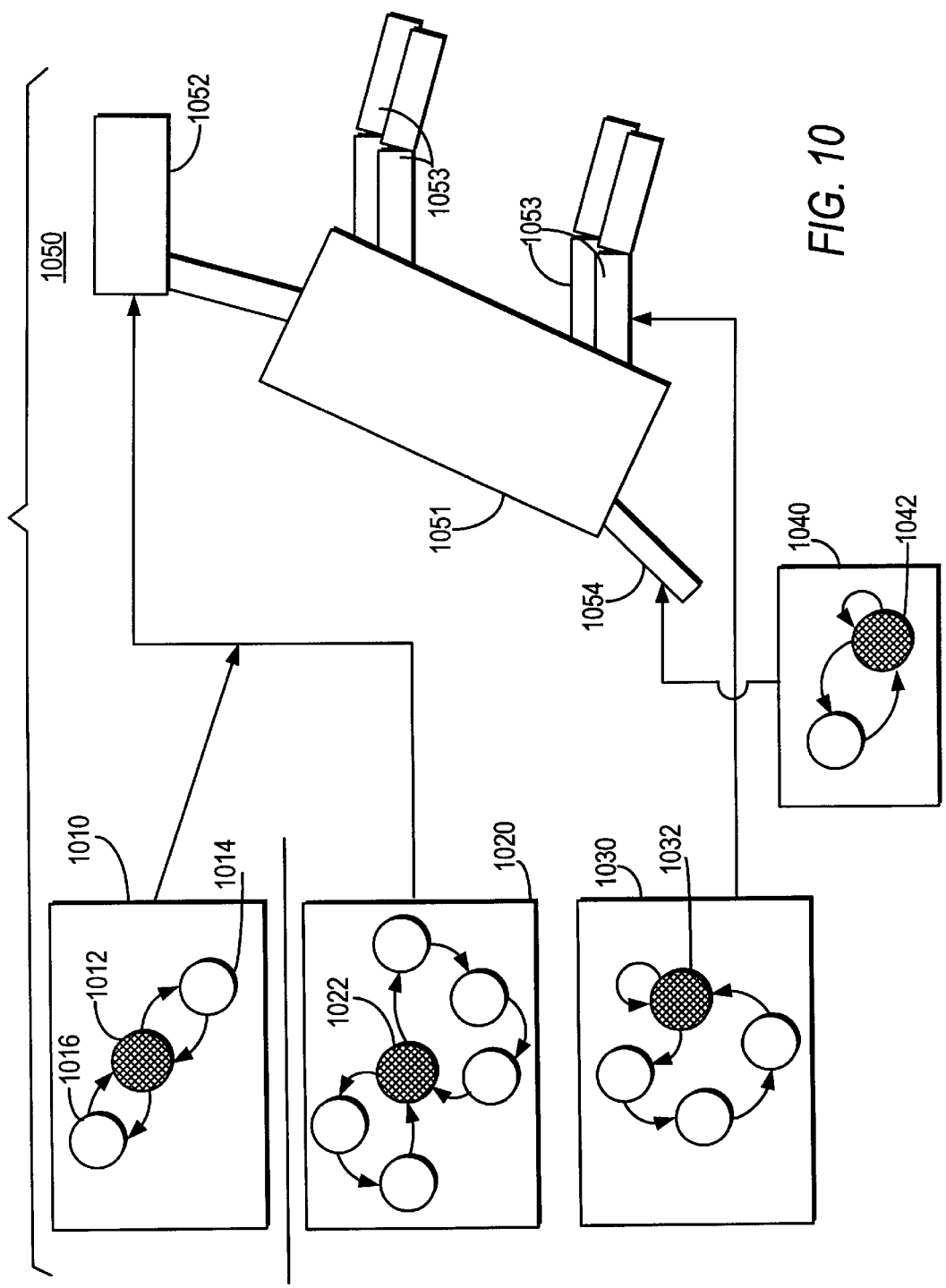
FIG. 10 depicts the movement of the pet robot in accordance with a single set of instructions governing all parts of the pet robot, or in accordance with a plurality of sets of instructions, one for each part of the pet robot.

As is shown in FIG. 10, a block diagram of a pet robot 1050 constructed in accordance with the invention is shown. Pet robot 1050 includes a main body portion 1051, a head 1052, legs 1053 and a tail 1054. Transition from a current position to a next position is achieved through the movement of one or more of the body portions through a predetermined number of movements. Plane 1010 represents the possible movements from a starting mode 1012 to other posture modes 1014 or 1016. Plane 1010 employs the "entire" mode, and therefor the transition arcs included movement for each part of pet robot.

Plane 1020 represents possible posture modes and transitions for the head only of the pet robot 1050, plane 1030 represents the same for the legs and plane 1040 represents the same for the tail. These independent planes are employed when less than all of the parts of pet robot 1050 are required to perform the transition to the next posture as dictated by the behavior information. The parts not specifically required therefore follow an independent transition path. For example, to walk plane 1030 will require that legs 1053 follow a predetermined transition path to accomplish this walking. However, plane 1020 for the head and plane 1040 for the tail can move in any allowable transition path. As is shown, in each of these individual planes, the transition paths lead back to a central, starting posture mode. This is to insure that each body part returns to a known position that will not affect the other movements of the pet robot. The selection of these paths is preferably determined based upon various sensor information and the determined emotional and instinctual values determined above. These paths could also be determined in any other numbers of ways. By determining these non-essential transition paths independently from the essential transition paths, a wider range of motions, and therefore a more realistic acting pet robot can be provided.

Finally, referring back to FIG. 3, control mechanism 43 produces control signal S5 for driving actuators 23 based on posture transition information S18. These produced control signals S5 are then transmitted to actuators 23. Actuators 23 are thereby driven to operate pet robot 1 in the desired manner.

In accordance with the above construction of the invention, the emotion and instinct model units 40 in controller 32 change the emotional and instinctive states of pet robot 1 based on the input information S1–S3 supplied thereto. Such changes of the emotional and instinctive states are thereby reflected upon the action of pet robot 1. This enables the pet robot to autonomously behave in accordance with emotional and instinctive states created by the robot in response to both internal and external stimuli.

Behavior deciding mechanism 41 in controller 32 determines the next state subsequent to the current state to be transitioned to based upon both the current state depending on a history of the input information S14 having been previously supplied to the pet robot, and the currently supplied input information S14. This also contributes to enabling the pet robot to autonomously behave in accordance with created emotional and instinctive states.

Posture transition mechanism 42 in controller 32 changes the current posture of pet robot 1 for transition from a current posture to a next posture corresponding to behavior command information S16 via a predetermined route. Pet robot 1 can therefor avoid taking an unsafe posture, or from turning over.

The emotional and instinctive states of pet robot 1 are changed based at least in part on input information S1–S3 supplied to controller 32. Thereafter, the action of pet robot 1 is determined in accordance with such changes of the emotional and instinctive states. The next posture to be transitioned to is selected depending on the decided behavior to be next implemented by pet robot 1 so that is able to autonomously behave in accordance with the emotional and instinctive states. As a result, pet robot 1 behaves very much like a genuine pet.

While the above embodiment has been described in connection with receiving the user's commands transmitted from the remote controller in the form of infrared rays, the present invention is not limited to this case. For example, the user's commands may be transmitted in the form of electrical waves or sound waves, including spoken language, musical notes or other audible indicators.

Also, while the above embodiment has been described in connection with receiving the user's commands via command receiving unit 30 made up of remote controller command receiver 13 and microphone 11, the present invention is not limited to this case. For example, a computer or other appropriate device may be connected to pet robot 1, and the user's commands may be received via the connected computer or device.

Furthermore, while the above embodiment has been described deciding the emotional and instinctive states employing emotion units 50A–50F indicating six kinds of emotions, and instinct units 51A–51D indicating four kinds of instincts, the present invention is not limited to this case. For example, other emotion or instinct units may be added. Stated otherwise, the emotional and instinctive states may be decided by a combination including other various kinds of emotion units and instinct units in any other suitable number than described above.

While the above embodiment has been described using the behavior deciding mechanism 41 to determine the next action based on command signals S1, external information signals S2, internal information signals S3, emotion and instinct state information S10, and behavior information S12, the present invention is not limited to this case. The next action may be determined based on less than all of command signals S1, external information signals S2, internal information signals S3, emotion and instinct state information S10, and behavior information S12.

Additionally, while the above embodiment has been described in applying the present invention to pet robot 1, the present invention is not limited to this case. For example, the present invention may also be applicable to other various robot apparatuses such as those robot apparatuses which are employed in the fields of games and exhibitions for the purpose of entertainment.

According to the present invention, as described above, because a robot apparatus includes emotion and instinct models linked to an action, and decides the next action to be taken by changing the emotion and instinct models based on the input information, the robot apparatus can autonomously behave in accordance with the newly created emotional and instinctive states. As a result, a robot apparatus autonomously behaving in a natural way can be realized.

Because the next operating state to be transitioned to subsequent to the current operating state is decided in accordance with both the current operating state depending on the input information having been previously supplied to the robot apparatus, and the currently supplied input information, the robot apparatus can autonomously behave in accordance with the created emotional and instinctive states. As a result, a robot apparatus autonomously behaving in a natural way can be realized.

Because the current posture of the robot apparatus is changed by transitioning from the current posture to a next posture corresponding to the input information via a predetermined route, the robot apparatus can avoid from taking an unsafe or an impossible posture, for from turning over. As a result, a robot apparatus autonomously behaving in a natural way can be realized.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A robot apparatus generating behavior or performing actions, comprising:
    means for generating one or more parameters of an emotion model, the values of said parameters defining a predetermined emotion;
    means for detecting an input signal supplied to said robot apparatus from an external stimulus;
    means for determining one or more semantic contents in accordance with said detected input signal;
    means for changing at least one of said emotion model parameters based upon said semantic content;
    means for generating a behavior model to generate behavior or perform actions in accordance with said emotion parameters of said emotion model; and
    means for controlling a posture of said robot apparatus based upon a posture transition model, said posture transition model including a plurality of nodes representing states of a posture between which transition is allowed;
    wherein transition between one or more pairs of said plurality of nodes of said posture transition model is defined based upon at least said input signal and a transition between one or more pairs of nodes of said behavior model.

2. The robot apparatus of claim 1, wherein said emotion model comprises a plurality of individual emotion model units, an output value of each of said individual emotion model units varying in accordance with said input signal.

3. The robot apparatus of claim 2, wherein the output values of said emotion model units vary further in accordance with the output values of the others of said plurality of emotion model units.

4. The robot apparatus of claim 1, wherein said determined semantic content affects each of said emotion model parameters in different ways.

5. The robot apparatus of claim 1, further comprising:
    means for generating a plurality of behavior nodes corresponding to each of a plurality of behavior states of said behavior model;
    means for generating a plurality of directionally oriented arcs, each of said arcs linking two of said behavior nodes and comprising a predetermined action of said robot upon transitioning from a first of said two linked behavior nodes to a second of said two linked behavior nodes;
    means for assigning each of said arcs a predetermined weighting coefficient in accordance with external, non-probability based factors; and
    means for controlling said robot apparatus to transition from a first behavior state corresponding to a first behavior node to a second behavior state corresponding to a second behavior node in along one of said directionally oriented arcs, in accordance with said associated weighting coefficients.

6. The robot apparatus of claim 5, wherein said weighting coefficients are modified in accordance with a user's encouragement of a particular action.

7. The robot apparatus of claim 5, wherein all of the weighting coefficients for all of said directionally oriented arcs emanating from a particular behavior node sum to one.

8. The robot apparatus of claim 5, wherein said first behavior node and said second behavior node are the same.

9. A robot apparatus generating behavior or performing actions, comprising:
    means for generating one or more parameters of an instinct model, the values of said parameters defining a predetermined instinct;
    means for detecting an input signal supplied to said robot apparatus from an internal stimulus;
    means for determining one or more semantic contents in accordance with said detected input signal;
    means for changing at least one of said instinct model parameters based upon said semantic content;
    means for generating a behavior model to generate behavior or perform actions in accordance with said instinct parameters of said instinct model; and
    means for controlling a posture of said robot apparatus based upon a posture transition model, said posture transition model including a plurality of nodes representing states of a posture between which transition is allowed;
    wherein transition between one or more pairs of said plurality of nodes of said posture transition model is defined based upon at least said input signal and a transition between one or more pairs of nodes of said behavior model.

10. The robot apparatus of claim 9, wherein said instinct model comprises a plurality of individual instinct model units, an output value of each of said individual instinct model units varying in accordance with said input signal.

11. The robot apparatus of claim 10, wherein the output values of said instinct model units vary in accordance with the output values of the others of said plurality of instinct model units.

12. The robot apparatus of claim 9, wherein said determined semantic content affects said instinct model parameters in different ways.

13. The robot apparatus of claim 9, further comprising:
    means for generating a plurality of behavior nodes corresponding to each of a plurality of behavior states of said behavior model;

means for generating a plurality of directionally oriented arcs, each of said arcs linking two of said behavior nodes and comprising a predetermined action of said robot upon transitioning from a first of said two linked behavior nodes to a second of said two linked behavior nodes;

means for assigning each of said arcs a predetermined weighting coefficient in accordance with external, non-probability based factors; and means for controlling said robot apparatus to transition from a first behavior state corresponding to a first behavior node to a second behavior state corresponding to a second behavior node in along one of said directionally oriented arcs, in accordance with said associated weighting coefficients.

14. The robot apparatus of claim 13, wherein said weighting coefficients are modified in accordance with a user's encouragement of a particular action.

15. The robot apparatus of claim 13, wherein all of the weighting coefficients for all of said directionally oriented arcs emanating from a particular behavior node sum to one.

16. The robot apparatus of claim 13, wherein said first behavior node and said second behavior node are the same.

17. A robot apparatus generating behavior or performing actions, comprising:

means for generating one or more parameters of an emotion model, the values of said parameters defining a predetermined emotion;

means for generating one or more parameters of an instinct model, the values of said parameters defining a predetermined instinct;

means for detecting an input signal supplied to said robot apparatus from an external stimulus;

means for detecting an input signal supplied to said robot apparatus from an internal stimulus;

means for determining one or more semantic contents in accordance with said detected input signals;

means for changing at least one of said emotion model parameters or said instinct model parameters based upon said semantic content;

means for generating a behavior model to generate behavior or perform actions in accordance with said emotion parameters of said emotion model and said instinct parameters of said instinct model; and means for controlling a posture of said robot apparatus based upon a posture transition model, said posture transition model including a plurality of nodes representing states of a posture between which transition is allowed;

wherein transition between one or more pairs of said plurality of nodes of said posture transition model is defined based upon at least said input signal and a transition between one or more pairs of nodes of said behavior model.

18. The robot apparatus of claim 17, wherein said emotion model comprises a plurality of individual emotion model units and said instinct model comprises a plurality of individual instinct model units, an output value of each of said individual emotion model units and an output value of each of said individual instinct model units varying in accordance with said input signals.

19. The robot apparatus of claim 18, wherein the output values of said emotion model units and the output values of said instinct model units further vary in accordance with the output values of others of said plurality of emotion model units and instinct model units.

20. The robot apparatus of claim 17, wherein said determined semantic content affects each of said emotion model parameters and each of said instinct model parameters in different ways.

21. The robot apparatus of claim 17, further comprising:

means for generating a plurality of behavior nodes corresponding to each of a plurality of behavior states of said behavior model;

means for generating a plurality of directionally oriented arcs, each of said arcs linking two of said behavior modes and comprising a predetermined action of said robot upon transitioning from a first of said two linked behavior nodes to a second of said two linked behavior nodes;

means for assigning each of said arcs a predetermined weighting coefficient in accordance with external, non-probability based factors; and means for controlling said robot apparatus to transition from a first behavior state corresponding to a first behavior node to a second behavior state corresponding to a second behavior node in along one of said directionally oriented arcs, in accordance with said associated weighting coefficients.

22. The robot apparatus of claim 21, wherein said weighting coefficients are modified in accordance with a user's encouragement of a particular action.

23. The robot apparatus of claim 21, wherein all of the weighting coefficients for all of said directionally oriented arcs emanating from a particular behavior node sum to one.

24. The robot apparatus of claim 21, wherein said first behavior node and said second behavior node are the same.

25. A robot apparatus able to transition between two of a plurality of posture states, comprising:

means for generating a plurality of posture nodes corresponding to possible postures taken by said robot apparatus;

means for generating a plurality of directionally oriented arcs, each of said arcs linking two of said posture nodes between which said robot apparatus can directly transition, each of said arcs corresponding to one or more actions of said robot apparatus to be implemented upon transition between said two posture nodes linked by said arc; and means for controlling said robot apparatus to transition from a first posture state corresponding to a first posture node and a second posture state corresponding to a second posture node along an arc linking said first and second posture nodes, therefore performing a predetermined action based upon at least an external stimulus and a command from a behavior model defining a plurality of possible behaviors of said robot apparatus.

26. The robot apparatus of claim 25, wherein each of said directionally oriented arcs represents a safe sequence of actions to be taken by said robot apparatus.

27. The robot apparatus of claim 25, wherein if it is desired for said robot apparatus to transition between two posture nodes which said robot apparatus cannot directly transition between, said robot apparatus transitions between one or more intermediate posture nodes.

28. The robot apparatus of claim 25, wherein said first posture node and said second posture node are the same.

29. The robot apparatus of claim 25, wherein at least one of said posture nodes is a neutral node.

30. The robot apparatus of claim 29, wherein said robot apparatus transitions to said neutral node when it is in an unrecognizable posture.

31. The robot apparatus of claim 30, wherein said unrecognizable posture is a result of said robot apparatus being moved while no power is supplied thereto.

32. The robot apparatus of claim 25, wherein at least one of said posture nodes is a fall down node.

33. The robot apparatus of claim 32, wherein said robot apparatus enters said fall down node upon a determination that said robot has fallen down.

34. The robot apparatus of claim 33, further comprising a sensor for determining when said robot has fallen down.

35. The robot apparatus of claim 33, w here in said robot determines its orientation upon a determination that it has fallen down.

36. The robot apparatus of claim 33, wherein said robot apparatus transitions to a neutral node from said fall down node.

37. The robot apparatus of claim 25, wherein:
said robot apparatus comprises a plurality of component units, each of said plurality of component units comprising:
means for generating a plurality of posture nodes corresponding to possible postures taken by said robot apparatus;
means for generating a plurality of directionally oriented discs, each of said arcs linking two of said posture nodes between which said robot apparatus can directly transition, each of said arcs corresponding to one or more actions of said robot apparatus to be implemented upon transition between said two posture nodes linked by said arc;
means for controlling said robot apparatus to transition from a first posture state corresponding to a first posture node and a second posture state corresponding to a second posture node along an arc linking said first and second posture nodes, therefore performing a predetermined action.

38. The robot apparatus of claim 37, wherein said transition of each component unit of said robot apparatus is determined independently.

39. The robot apparatus of claim 37, wherein the transitions of each component required for a particular action of said robot apparatus are determined together, and the transitions of the remainder of said components are determined independently.

40. A robot apparatus, comprising:
a portion;
control means for controlling said portion; and
a posture transition model including states of a posture between which transition is allowed;
wherein said posture transition model includes a neutral state which is defined such that the actions of said robot apparatus are performed in a safe manner in transitions from said neutral state to other states.

41. The robot apparatus of claim 40, wherein said safe manner is provided by reducing a torque of each of one or more articulation actuators or lowering an operating speed of each of a plurality of components.

42. The robot apparatus of claim 40, wherein said posture transition model comprises a first node indicative of a first posture of said robot apparatus, a second node indicative of a second posture of said robot apparatus, and an arc indicative of capable transitioning directly from said first node to said second node.

43. The robot apparatus of claim 40, wherein said posture transition model transits postures by employing a directional graph in which a plurality of nodes representing postures capable of being taken by said robot apparatus are registered beforehand, and every two among the postures capable of being directly transited from one to the other are coupled by a directional arc.

44. The robot apparatus of claim 43, wherein said posture transition model plans a posture transition schedule by searching a route from a node corresponding to the current posture to a next node while following a direction indicated by each respective directional arc.

45. An autonomous robot apparatus comprising:
a main body;
moving means for moving said main body; and
posture detecting means for detecting a current posture of said robot apparatus from among a plurality of predefined postures;
wherein when said posture detecting means cannot detect said current position of said robot apparatus, said robot apparatus is shifted to a safe mode for transition to a predetermined posture.

46. The robot apparatus of claim 45, wherein said safe mode is provided by reducing a torque of each of one or more articulation actuators or lowering an operating speed of each of a plurality of components.

47. The robot apparatus of claim 45, wherein said moving means comprises a posture transition model, said posture transition model comprising a first node indicative of said predetermined posture of said robot apparatus, and an arc indicative of capable transitioning directly to said predetermined posture in said safe mode.

48. The robot apparatus of claim 45, wherein said moving means further comprises a posture transition model, wherein said posture transition model transits postures by employing a directional graph in which a plurality of nodes representing said plurality of predefined postures, and at least one of said postures capable of being directly transited to in said safe mode.

49. The robot apparatus of claim 45, wherein said moving means further comprises a posture transition model, and said posture transition model plans a posture transition schedule by searching a route from a node in said safe mode to a next node while following a directional indicated by each of a plurality of directional arcs.

50. A robot apparatus, comprising:
a portion;
control means for controlling said portion; and
a posture transition model including states of a posture between which transition is allowed;
wherein said posture transition model includes a falling-down state which is defined such that the actions of said robot apparatus are performed in a safe manner in transitions from said falling-down state to a predefined one of said states of said posture.

51. The robot apparatus of claim 50, wherein said predefined one of said states of said posture is a neutral state which is defined such that the actions of said robot apparatus are performed in a safe manner in transitions from said neutral state to others of said states of said posture.

52. The robot apparatus of claim 50, wherein said safe manner is provided by reducing a torque of each of one or more articulation actuators or lowering an operating speed of each of a plurality of components.

53. The robot apparatus of claim 50, wherein said posture transition model comprises a first node indicative of a first posture of said robot apparatus, a second node indicative of a second posture of said robot apparatus, and an arc indicative of capable transitioning directly from said first node to said second node.

54. The robot apparatus of claim 50, wherein said posture transition model transits postures by employing a directional graph in which a plurality of nodes representing postures capable of being taken by said robot apparatus are registered beforehand, and every two among the postures capable of being directly transited from one to the other are coupled by a directional arc.

55. The robot apparatus of claim 50, wherein said posture transition model plans a posture transition schedule by searching a route from a node corresponding to the current posture to a next node while following a direction indicated by each respective directional arc.

56. The robot apparatus of claim 50, further comprising an acceleration sensor for determining when said robot apparatus is falling down.

57. A robot apparatus, comprising:

a main body;

a portion coupled with said main body;

detection means for detecting an exterior stimulus;

behavior determining means for determining a behavior to be performed by said robot apparatus based at least in part upon the detected external stimulus;

an entire posture transition model defining postures between which transition of the entire robot apparatus is allowed;

a component posture transition model defining postures between which transition of one or more components of the robot apparatus is allowed; and control means for controlling said entire robot apparatus and said one or more components of said robot apparatus;

wherein said control means decides a behavior of said robot apparatus based upon the external stimulus, selects said entire posture transition model or said component posture transition model in accordance with the decided behavior, and controls the entire robot apparatus, or one or more components thereof, based upon the selected posture transition model.

58. The robot apparatus of claim 57, wherein said entire posture transition model defines a movement for a substantial portion of said one or more components.

59. The robot apparatus of claim 58, wherein the movement of said one or more components not defined by said entire posture transition model is defined independently of said entire posture transition model.

60. The robot apparatus of claim 57, wherein said component posture transition model defines a movement for one or more of said one or more components.

61. The robot apparatus of claim 60, wherein the movement of said one or more components not defined by said component posture transition model is defined independently thereof.

62. The robot apparatus of claim 57, wherein said entire posture transition model and said component transition model comprise a first node indicative of a first posture of said robot apparatus, a second node indicative of a second posture of said robot apparatus, and an arc indicative of capable transitioning directly from said first node to said second node.

63. The robot apparatus of claim 57, wherein said entire posture transition model and said component transition model transit postures by employing a directional graph in which a plurality of nodes representing postures capable of being taken by said robot apparatus are registered beforehand, and every two among the postures capable of being directly transited from one to the other are coupled by a directional arc.

64. The robot apparatus of claim 63, wherein said entire posture transition model and said component posture transition model plan a posture transition schedule by searching a route from a node corresponding to the current posture to a next node while following a direction indicated by each respective directional arc.

* * * * *